(12) United States Patent
Karg

(10) Patent No.: US 12,162,091 B2
(45) Date of Patent: Dec. 10, 2024

(54) 3D PRINTING METHOD FOR PRINTING COMPONENTS, AND CORRESPONDING DEVICES

(71) Applicant: Denise Bennewitz, Eurasburg (DE)

(72) Inventor: Michael Karg, Gauting (DE)

(73) Assignee: Denise Bennewitz, Gauting (DE)

( * ) Notice: Subject to any disclaimer, the term of this patent is extended or adjusted under 35 U.S.C. 154(b) by 533 days.

(21) Appl. No.: 17/269,175

(22) PCT Filed: Aug. 14, 2019

(86) PCT No.: PCT/EP2019/071866
§ 371 (c)(1),
(2) Date: Feb. 17, 2021

(87) PCT Pub. No.: WO2020/035543
PCT Pub. Date: Feb. 20, 2020

(65) Prior Publication Data
US 2021/0276097 A1 Sep. 9, 2021

(30) Foreign Application Priority Data

Aug. 17, 2018 (DE) .......................... 102018213868.0
Nov. 8, 2018 (DE) .......................... 102018219032.1

(51) Int. Cl.
*B23K 26/06* (2014.01)
*B22F 10/28* (2021.01)
(Continued)

(52) U.S. Cl.
CPC .......... *B23K 26/0643* (2013.01); *B22F 10/28* (2021.01); *B22F 10/36* (2021.01);
(Continued)

(58) Field of Classification Search
CPC . B23K 26/0643; B23K 26/0648; B22F 10/36; B22F 10/28; B22F 12/226;
(Continued)

(56) References Cited

U.S. PATENT DOCUMENTS

2005/0070035 A1* 3/2005 Yazaki ............... B23K 26/0732
438/22
2005/0170572 A1 8/2005 Hongo et al.
(Continued)

FOREIGN PATENT DOCUMENTS

CN 108284225 A 7/2021
DE 102011079521 A1 1/2013
(Continued)

OTHER PUBLICATIONS

Khairallah, S.A., et al., "Laser powder-bed fusiong additive manufacturing: Physics of complex melt flow and formation mechanisms of pores, splatter, and denudation zones", Acta Materialia 108:36-45 (2016).
(Continued)

*Primary Examiner* — Janie M Loeppke
*Assistant Examiner* — Simpson A Chen
(74) *Attorney, Agent, or Firm* — Seager, Tufte & Wickhem, LLP

(57) ABSTRACT

The invention relates to a 3D component printing process wherein a body is built up from starting material that is irradiated trace-by-trace with a beam, and to a 3D printed component produced by this process. The beam has an effective area profile that is not rotationally symmetric, the effective area profile of the beam being oriented in accordance with the track direction. The invention further relates to a beam orienting assembly for a 3D printing machine and a 3D printing machine comprising such a beam orienting assembly.

13 Claims, 4 Drawing Sheets

Figure 1:
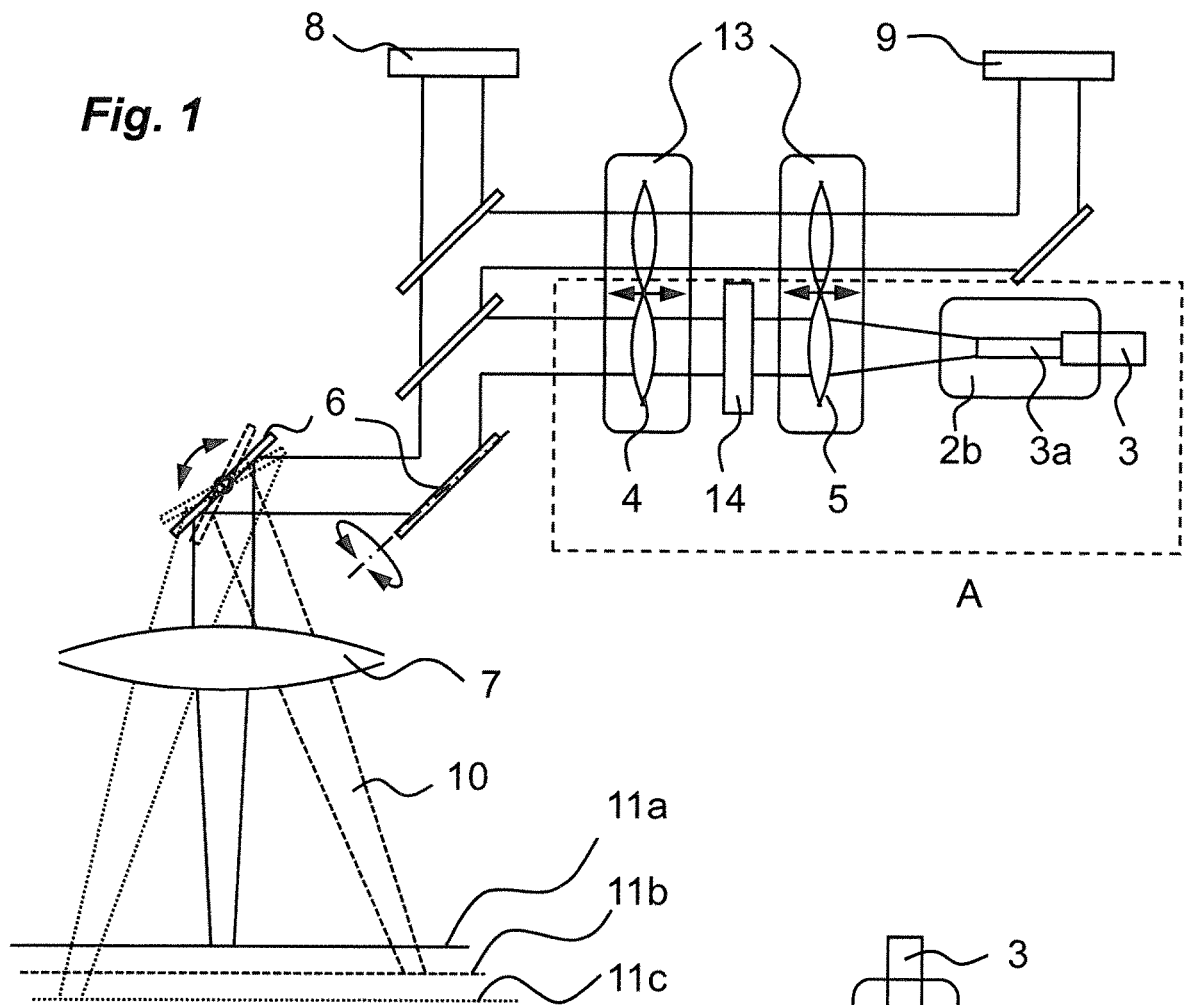

(51) Int. Cl.
*B22F 10/36* (2021.01)
*B22F 10/366* (2021.01)
*B22F 12/00* (2021.01)
*B22F 12/41* (2021.01)
*B22F 12/44* (2021.01)
*B22F 12/49* (2021.01)
*B33Y 10/00* (2015.01)
*B33Y 30/00* (2015.01)

(52) U.S. Cl.
CPC .......... *B22F 10/366* (2021.01); *B22F 12/226* (2021.01); *B22F 12/44* (2021.01); *B22F 12/49* (2021.01); *B23K 26/0648* (2013.01); *B33Y 10/00* (2014.12); *B33Y 30/00* (2014.12); *B22F 12/41* (2021.01)

(58) Field of Classification Search
CPC ........ B22F 12/44; B22F 12/49; B22F 10/366; B22F 12/41; B33Y 10/00; B33Y 30/00; G02B 7/02; G02B 7/14; G02B 7/16
USPC ..................................................... 219/121.75
See application file for complete search history.

(56) References Cited

U.S. PATENT DOCUMENTS

| | | |
|---|---|---|
| 2012/0267345 A1 | 10/2012 | Clark et al. |
| 2017/0008127 A1 | 1/2017 | Hyatt et al. |
| 2018/0193955 A1* | 7/2018 | Karp ...................... B33Y 30/00 |
| 2018/0272613 A1* | 9/2018 | Cieszynski ........... B29C 64/277 |
| 2018/0345413 A1* | 12/2018 | Wuest .................... B33Y 30/00 |
| 2019/0039175 A1* | 2/2019 | Schnick ............... B23K 26/034 |

FOREIGN PATENT DOCUMENTS

| | | |
|---|---|---|
| DE | 102015202347 A1 | 8/2016 |
| DE | 102017200119 A1 | 7/2018 |
| EP | 2335848 B1 | 8/2014 |
| EP | 3017895 A1 | 5/2016 |
| EP | 2909007 B1 | 8/2017 |
| JP | 2004314406 A | 11/2004 |
| KR | 101740266 B1 | 5/2017 |
| WO | 2012136615 A1 | 10/2012 |
| WO | 2017190863 A1 | 11/2017 |

OTHER PUBLICATIONS

Optical System for Variable Beam Shaping, Annual Report for FhG ILT (Fraunhofer—Institute for Laser Technology) (2017) original and translated documents, 2 pages.
International Search Report and Written Opinion for International application No. PCT/EP2019/071866, mailed on Oct. 17, 2019, mailed on Oct. 17, 2019, original and translated documents, 19 pages.
European Communication Article 94(3), EP Application No. 19755877.8, Apr. 12, 2022 (33 pages).
First Office Action, Chinese Patent Office, CN Application No. 201980067214.1, Aug. 3, 2022 (9 pgs) (English Translation).

* cited by examiner

3D PRINTING METHOD FOR PRINTING COMPONENTS, AND CORRESPONDING DEVICES

PRIORITY

This application is a US national stage filing of international PCT application PCT/EP2019/071866, filed Aug. 14, 2019, which claims the benefit of priority to German Patent Application Serial No. DE102018213868, filed Aug. 17, 2018 and to German Patent Application Serial No. DE102018219032.1, filed Nov. 8, 2018, which are each incorporated by reference herein in their entirety and for all purposes.

The present invention relates to the generically claimed subject-matter and thus to the printing of components.

The so-called 3D printing of components is known. In such processes, a component to be manufactured is built up successively by irradiating material to cause it to adhere to each another in such a way that the desired component is formed. This adhesion can occur, for example, by triggering a local chemical addition reaction or, for example, by melting and/or sintering powders by means of adequate high-energy radiation. These manufacturing processes are therefore also referred to as additive manufacturing processes.

In additive manufacturing processes, such as laser melting, there is a problem in that manufacturing with conventional machines is expensive due to the slow production speeds. It is not possible to increase production speed simply by using higher laser power for an ever faster melting because in that case the problems associated with heating and cooling the material—also due to the temperature gradients generated-would become even greater.

Various beam cross sections have been proposed for improving manufacturing. For example, in addition to a beam cross-section with a Gaussian profile, beams with a so-called top-hat profile are used, or several beams are combined with a greater or lesser degree of overlap to form lines or matrices. In addition, the use of beam profiles is proposed with which preheating of the material to be melted takes place in a region of lower beam intensity, cf. e.g. EP 2 335 848 B1.

A system according to EP 2 909 007 B1 is directed to providing a continuous melt pool by forming a laser line with a contiguous intensity distribution from individual beams. A contiguous intensity distribution is understood to mean that the intensity within the exposed area does not fall below 10% of the maximum intensity in this area. A moving means preferably has one or two translation axes which may be perpendicular to each other. It is stated that by an arrangement of individual laser spots, their diameter and by modulation of their power the acting power density distribution is spatially and temporally changed in such a way that, by the temperature gradient developing in the material, the dimensions of the resulting melt pool are adapted to the component geometry to be produced. In this manner, it shall be made possible to set the dimensions of the melt pool in the length dimension, the width dimension and the depth dimension independently of each another and to change them dynamically during processing.

From the publication "Laser powder-bed fusion additive manufacturing: Physics of complex melt flow and formation mechanisms of pores, spatter, and denudation zones" by Saad A. Khairallah, Andrew T. Anderson, Alexander Rubenchik, Wayne E. King in Acta Materialia 108 (2016) 36-45, it is known that the formation of deep depressions during the melting process should be avoided in order to prevent pore formation. When changing direction along a scan track, the laser intensity is to be reduced because additional heat could lead to deep and narrow depressions that collapse and form pores. In contrast, a suitable scan vector overlap is to increase the densification by eliminating partially melted and trapped parts and associated shallow lateral pores. The authors suggest a gentle ramp down of the laser power at the end of the scan track to improve the surface quality.

EP 3 017 895 A1 discloses a process for manufacturing a component by selective laser melting. A laser field is generated with, e.g., up to 20 simultaneously used lasers, which can be selectively switched on or off in order to irradiate or not irradiate specific areas. This is to melt powdered material selectively for generating contours. It is apparent that the switching off necessarily reduces the irradiated power in comparison to a maximum power which can be generated using all lasers together. Where effects of an especially high power for particularly fast processing in product manufacture have to be taken into account, the changing power makes the processing even more difficult.

DE 10 2011 079 521 A1 discloses a process in which a laser beam for a layer-by-layer production of three-dimensional objects is formed by a beamforming system. In this process, the maximum power density in the focal point is to be set no higher than at 50% above the mean value of the power density in the focal point. This is stated to be advantageous when the system is used with plastic particles.

WO 2012/136615 A1 discloses a system for laser melting in which an intensity profile improved in comparison to a Gaussian beam is to be used. It is stated that in known beam profiles the melting of the edge particles causes problems at the edge due to a drop in intensity, which makes the process difficult to control and poses a high risk of a reduced surface quality of the component. Therefore, an intensity profile which is uniform over a defined area is sought and which, in particular, is to be almost rectangular.

WO 2017/190863 A1 discloses a method for simplifying the calibration of an irradiation system.

An "OPTICAL SYSTEM FOR VARIABLE BEAM SHAPING" is known from an annual report of the FhG (Fraunhofer) ILT. Here, the intensity profile, as an important process parameter, is stated to significantly affect the machining result of laser-assisted machining processes. In many applications, the frequently Gaussian intensity profile emitted by a laser beam source is said to be transformed into process-adapted intensity profiles by means of optical beam shaping elements. However, the intensity profiles formed in this way are static, and a dynamic adaptation to the process is not possible. Therefore, an optical system is described which optionally provides a rotationally symmetric, Gaussian or a homogeneous, linear spot in the machining plane. It is stated that an optical system consisting of cylindrical lenses may be provided for shaping a Gaussian input beam into a homogeneous, linear spot in the machining plane, and that in a process for which a patent application has been filed by Fraunhofer ILT, the system is adapted in such a way that is possible to vary the degree of homogenization.

Reportedly, in addition to a rotationally symmetric intensity distribution with a Gaussian profile, the optical system is able to provide a linear intensity distribution with an aspect ratio of 30:1. Here, the linear intensity distribution is to have a high homogeneity in the longitudinal axis. During the switching process between the intensity profiles, the working distance is not to be changed. The system is stated to require <0.2 s to change to another intensity profile. In addition, the fused silica cylindrical lenses that are used reportedly allow the use of laser powers of up to 2 kW.

It is stated that, in general, all laser material processing methods in which the intensity profile is homogenized in the machining plane profit from variable beam shaping. Additionally, due to the degree of freedom gained, it should be possible to use Gaussian profiles, and there should be positive effects on the processing time and quality.

It is the object of the present invention to enable a cost-effective production of high-quality components.

This object is achieved with the subject-matter of the independent claims. Preferred embodiments are found in the dependent claims.

According to a first basic idea of the invention, a 3D component printing process is proposed in which a body is built up from starting material which is irradiated track-by-track with a beam having an effective area profile that is not rotationally symmetric. The effective area profile of the beam is preferably oriented in accordance with and/or following the track direction. The effective area profile can be defined as the area in which a build-up, melting, curing and/or heating of starting material takes place. For example, an effective area profile can be defined as the area in which a powdered starting material is heated and/or melted in order to achieve a corresponding deposition along the track (so-called hatches) after renewed solidification thereof.

In order to change the starting material in such a way that the body is built up, different beams may be used. In the case of polymerizable liquids it is, in particular, possible to use irradiation with UV light or the like, the energy input of which only has to be sufficient for triggering polymerization locally. Other starting materials, such as starting materials in powder form (e.g. metallic materials), often have to be melted with beams of sufficiently high energy, such as electron beams, ion beams or laser beams of high beam intensity. It will be understood that, depending on the focus, beams will often have a smaller or greater central region, and around it a region of lower intensity in which the beam intensity, i.e. the power per area, drops rapidly and is not suitable for contributing significantly to the building of the body from starting material. How large the effective area is will, among other factors, depend on the total beam power, the focalization, the beam speed, and the material.

In conventional laser component printing processes, the effective area profile will be the one at which the starting material in powder form is melted or sintered. It is clear that the beam will be completely rotationally symmetric in rare cases only. On the one hand, the beam is often deflected from a central point above a build-up plane, especially in the case of large bodies to be formed, in order to achieve the build-up of the body from starting material distant from the center of the processing surface. Assuming a circular beam cross-section at a perpendicular incidence, without special optical measures a deviation from rotational symmetry will be observed at the corners of an inclined beam. However, such minor deviations shall be disregarded. In the context of the invention, the area profile is therefore understood to be not rotationally symmetric, in particular, only if the deviations from a pure rotational symmetry exceed this effect, in particular in such a way that, for at least 10% of the effective area profile, the deviations of the beam intensity from a pure rotational symmetry are at least 10% larger, preferably at least 20% larger, than due to the described effect. In other words, even in the case of a vertical section through the beam, there is an area profile which deliberately and purposefully deviates from rotational symmetry by suitable measures. According to the present invention, this not rotationally symmetric area profile is then oriented in accordance with the track of the beam. Such an area profile that is not rotationally symmetric may, for example, already be provided upstream of a galvanometer with which the beam is deflected in the machining plane.

In the following it will become apparent that an orientation can be achieved with suitable beam-shaping, beam-steering or beam-limiting systems, and/or optionally also with a suitable orientation of the body during build-up.

It has been found that with such an approach it is possible to produce high quality components particularly quickly, and largely independently of the current orientation of the track, for example where the track is curved. The invention is readily usable with straight tracks and also offers advantages, for example, in cases where the body is built up, in a respective machining plane, by means of substantially parallel tracks (forming hatches of built-up material), the tracks of different machining planes (in particular the tracks of directly consecutive machining planes) preferably extending obliquely and/or crosswise to each other (e.g. at an angle of 90°, 60° or a prime number). Here, the orientation of the area profile ensures that it is possible to work with practically uniform beam energy in every layer and with the same beam velocities, which is advantageous for obtaining a body having homogeneous properties.

Alternatively, and/or additionally, it is also possible to scan curved tracks and to thus orient the effective area profile in accordance with the trajectory in each case. It is noted that here, too, high quality components can be produced rapidly, and largely independently of the radius of curvature of the track. Where the radius of curvature is very large in comparison to the width of the beam, even where arcs of around 90° are required, over the entire track surface an almost uniform heating is achieved at a constant scan speed. Here, in view of beam rotation, the beam width as such is not tangentially oriented in some places. Rather, an almost uniform power density is used along the track.

This eliminates the need to end a scan track and to reorient the workpiece, which not only costs time but may also cause problems at the start of the track. It offers advantages for arc lines that correspond to large angles. This is particularly the case if the arc line includes angles of at least 20°, preferably of more than 30°, especially of more than 45°.

However, there are advantages not only with arc lines, i.e. parts of circular lines, but also with generally curved tracks. In particular, it should be noted that it is possible, even with curved lines, to direct beams from plane to plane in such a way that the lines and/or hatches repeatedly intersect at the planes and do not, for example, disadvantageously extend substantially in parallel in different planes.

It is also possible to ensure an unexpected high quality with small arcs. It is true that during scanning of arcs having a small radius more energy is supplied in the radially inner area, which per se could result in a higher temperature there. However, where the center of the arcs lies laterally of the beam, several mitigating effects concur. On the one hand, the transverse heat dissipation is greater, because heat can also dissipate transversely. This already applies to the build-up of walls but is particularly true for inside volumes where the track is to be set next to already existing, compacted material. There, heat is dissipated not only in the downward direction, but also laterally into this material. On the other hand, the beam intensity at the edge is often lower anyway, unless special measures have to be taken.

How strong such an edge drop should be in the ideal case will depend, among other things, on the material to be melted. Since the hatches must partially overlap, the edge drop should be selected in such a way that sufficiently deep melting or the like of the material takes place at the edge, but that, at the same time, the melting does not cause any disadvantageous material change.

Even where the center of arcs lies within the line, the somewhat higher energy input usually proves to be uncritical, because arcs with such narrow radii are usually short, so that the total duration of the irradiation will be short and thus the additional energy input remains low.

It can be advantageous if, in the 3D component printing process, the effective area profile has a width B1 transverse to the track direction and a width B2 in the track direction, where B1≥1.5 B2, preferably B1≥3 B2 or B1≥5 B2. Typically, an effective wide-spread beam transverse to the track is desired. A sufficiently wide beam that has a sufficiently wide effective area profile transverse to the track direction is advantageous because the same area can be traversed with fewer tracks. In addition, nowadays the beam velocity along the track is often not determined by the time it takes to supply the starting material with the energy required to build up the body; rather, already today care must often be taken to ensure that the starting material is not heated too quickly, because this leads to undesirable spattering, which could impair the quality of the printed body. A particularly wide beam is advantageous in this respect. For this reason, beams are preferred that are at least three times wider transversely to the track direction than in the track direction, whereas if the beam widths are too small, the additional effort of orienting the effective area profile will pay off less. It will be appreciated that particularly wide beams are advantageous where it is intended to produce especially massive bodies which have large volumes especially inside the body. Here, the effective area profiles transverse to the track direction may often be larger than 5 or 10 times the width in the track direction. As mentioned above, it is also possible to produce beams having a width of e.g. 30:1, and it will be appreciated that even beams with a ratio of more than 40:1, more than 50:1, more than 60:1, more than 70:1, more than 80:1, more than 90:1 or more than 100:1 can be used. It is noted that in addition to a fairly wide area profile, a pre-treatment zone may also be provided in which material is preheated, for example, prior to its melting, in order to make the heating less abrupt even if very high beam velocities are selected.

Altogether, it is advantageous if the width B1 of the effective area profile, at which, for example, melting of powder material takes place, is at least 1.5 mm, at least 2 mm, at least 3 mm, at least 5 mm or at least 10 mm. With the progress in available laser power and the power resistance of the elements used for beam deflection and/or beam shaping, in particular optical elements, it is possible to usefully select even larger widths such as, for example, 5 mm, 10 mm, 15 mm or 20 mm or above, respectively. Provided there is sufficient power, with such wide beams preferably beam velocities of at least 300 mm/sec along the track, preferably above 600 mm/sec and in particular above 1000 mm/sec are used, in particular in cases where metal powder, metal carbide powder, metal nitride powder and/or ceramic powder to be sintered (such as metal oxide ceramic powder) are used as starting material.

In a preferred embodiment, the width B2 in the track direction will be at least 0.1 mm, preferably at least 0.5 mm. Where the width B2 is as low as 0.1 mm and high melting point starting material is used, the heating rate will be very high, which can lead to spattering, especially where oxide layers of the starting material must first be overcome by heating. A length of at least 0.5 mm is particularly advantageous, especially with beam velocities along the track of around or above 50 mm/sec, 100 mm/sec, 300 mm/sec, 450 mm/sec or 600 mm/sec. It is noted that large beams can also be used to build up the inside of the body, for example the area at a sufficient distance from walls, whereas the exterior areas such as walls may optionally also be produced with another smaller beam. On the one hand, this has advantages because less energy has to be irradiated to the exterior area, i.e. to the "skin" or surface of the body, and also because possibly a finer guiding of the beam is desired in order to reduce the required post-treatment steps. It is also possible to optionally irradiate different amounts of energy to where, by different grain formation, successful or unsuccessful re-melting of material, etc., specific material properties are to be achieved. For example, by selecting suitable beam power parameters such as beam velocity and beam width, a specific melting behavior can be achieved, eutectics can be formed, etc. In this respect, a 3D printing machine according to the invention may have two lasers of different power, e.g. a first laser with a power of at least 2 KW, at least 4 KW or at least 8 KW, and a second laser with a power of less than 800 W, preferably less than 400 W or less than 200 W.

In a particularly preferred embodiment, the 3D component printing process is carried out in such a way that the beam is directed along a track that is curved at least along certain portions. The effective area profile can then be oriented in accordance with the curvature of the track simultaneously with the scanning of the track.

In this connection it is noted that in 3D printing, the print tracks are usually known in advance, for example because they are determined in advance on the basis of a known CAD design. In this way, it is particularly easy to prevent that hatches in different planes run in parallel for too long. In general, it is possible to either scan curved tracks with the beam and to rotate the effective area profile accordingly, and/or it is possible to first determine the track orientation, in particular layer by layer, and then to rotate the beam in accordance with pre-planning.

The shaping of the beam to an area profile that is not rotationally symmetric can be achieved by various mechanisms and/or components, e.g., by free-form optics, a liquid crystal SLM, an acousto-optic beam former, and/or a diffractive optical element (DOE). Some of these mechanisms and/or components also readily allow the rotation of the area profile which is produced or to be produced (such as liquid crystal SLM or acousto-optic beamformers). Other components (such as diffractive optical elements) may be rotated or even exchanged for rotating the beam. Insofar, a beam shaping device may be present that is placed in the beam path. The beam shaping device may be exchangeable. Alternatively, or additionally, the beam shaping device may be rotatable, for example by means of an additional beam shaping rotating device.

A change of the shape and/or the orientation of the area profile can be achieved by changing specific optical elements (for example by changing different diffractive optical elements) for beam shaping, for which purpose different DOEs in a magazine can be accessed. For example, the change of shape and/or orientation of the area profile may occur, e.g., from machining plane to machining plane. However, it is also possible to change the shape and orientation of the area profile in a specific machining plane, depending on the beam shaping device and/or the beam shaping rotation device used even in real time.

In particular, this makes it possible to perform an orientation and/or rotation even when the laser is switched off, and it then becomes possible to guide all hatches or "hatch lines" in a layer or plane in parallel and to perform a change of direction between two layers only at a time, in particular while the beam is switched off. Nevertheless, it is also possible to perform a beam orientation while the beam is switched on.

It may be advantageous if the 3D component printing process is carried out in such a way that the effective area profile is rotated during track-by-track irradiation. In general, it would not be necessary to rotate the area profile simultaneously with the irradiation. It would also be possible to rotate an orientation with a beam that is interrupted or is located outside the object to be printed. Alternatively, however, it is possible, and generally also preferred, to rotate the effective area profile simultaneously with the irradiation. This can be done in different ways depending on how the effective area profile is actually produced. For example, it is possible to generate a wide beam by using cylindrical lenses. These may be oriented in accordance with their longitudinal axis so as to rotate the beam as required. It is also possible to generate the beam, with which material is melted or supplied with energy for bonding, from a plurality of individual beams, such as individual laser diodes arranged in a matrix. The individual diodes of the matrix may then be switched in such a way that the effective area profile orients itself during track-by-track irradiation as required. It is noted that in such a case, the accuracy with which the rotation of the effective area profile can follow, for example, a continuously curved track will depend on the number of laser diodes in the matrix. In the simple case of a 2×2 laser diode matrix there will be only 4 different orientations. It is therefore preferred to use a matrix that has, for example, 3×3, 4×4, 5×5, 6×6 laser diodes or more. Incidentally, the use of a square matrix is not mandatory.

Instead of switching individual diodes of a matrix, it is also possible to orientate a diode arrangement, for example, a linear diode array emitting a laser beam, so as to achieve the rotation of the effective area profile. Another possibility is to introduce diffractive optical elements into the beam to change the beam profile. Such diffractive optical elements can optionally be interchanged to effect the orientation of the effective area profile and/or, with a suitable mechanism they can be rotated as such. It is advantageous to use a circular input profile where diffractive optical elements alone form the effective area profile from an input beam, so that then the orientation of the effective area profile depends only on the mechanical orientation of the diffractive optical element. The diffractive optical element in such a case can be rotated in a controlled manner, for example.

From the above it will be apparent that deviations between the course of the track and the orientation of the effective area profile may well occur without deviating from the invention. On the one hand, deviations may occur because the rotation of the effective area profile, as for example in the case of matrix diodes, is not sufficiently finely graduated, because the mechanical tracking of a diffractive optical element is not completely precise and/or because a time offset occurs between the beam guidance on the track and the rotation of lenses, diffractive optical elements and so on. However, it will be seen that such deviations are preferably less than 45°, particularly preferably less than 30°, especially preferably less than 15° and typically in the range of not more than 10°, in the case of particularly high-quality systems even less than 5° deviation.

It will be seen that in the case of very large deviations the advantages of the invention cannot be fully obtained, while very small deviations have hardly any effect, i.e. even where work is carried out in the limit range of possible speeds and/or energies, advantages are not necessarily obtained from a particularly high accuracy. The permissible tolerances can be power-dependent, but, in general, with currently available powers of from 5 to 10 kW, deviations of between 5° and 12°, preferably between 8° and 10°, are readily acceptable even at beam speeds >600 mm, without losing significant advantages of the invention.

It should be mentioned, moreover, that various measures are possible for generating and orienting an effective area profile that is oriented in accordance with a track. Thus, a diode matrix could be combined with a diffractive optical element and cylindrical lenses, and so on.

It may be advantageous if the 3D component printing process is carried out in such a way that starting material is melted by the irradiation and a profile of the starting material melting beam intensity in the direction transverse to the track is at least 1.5 times as wide than in the direction of the track, preferably at least two times as wide, particularly preferably at least three times as wide, in particularly preferred variants also at least 4 times, 5 times or 10 times as wide.

It is first pointed out that it is not alone the beam which is to be used, for example in selective laser sintering, for heating the powdered material until it bonds with other material. Rather, it is sufficient to considerably heat up the partially formed component and/or the powder material and then to introduce only a small amount of additional energy for melting by irradiation. This allows the use of rather wide beams with beam powers that can already be reached today, even when high track speeds are desired. This makes sense when material is melted transverse to the track in a considerable width and/or when energy that is sufficiently high is applied to said material for bonding with other material. The cost effectiveness increases when the material-melting beam intensity transverse to the track is at least 1.5 times as wide as in the direction of the track, preferably at least 2 times, 3 times or 5 times as wide. Preheating improves the usability of particularly wide beams. It will be appreciated that, e.g., a 10-fold widening can be achieved, the beam orientation regularly ensuring, irrespective of very high energy input, that the material is melted as required and/or acted upon for bonding with other material, especially if preheated and/or additionally heated without beams.

Where the beams are particularly wide, it is advantageous to achieve a particularly good orientation. Therefore, it will be particularly preferred when, where the beam is at least three times as wide, the deviation of the actual rotation of the effective area profile during the track-by-track irradiation is less than 25°, preferably less than 15°. Where the beam is at least 5 times as wide, it is preferred to accurately set the orientation within at least 15°. It should be noted that even with very wide beams, track speeds of over 60 cm/sec, preferably over 1 m/sec (e.g. for Al—Si alloys) and/or track speeds of over 50 mm/sec, preferably over 150 mm/sec (e.g. for Al—Cu alloys) can be achieved.

By widening the beam, it is possible, among other things, to change the spattering characteristics of the material to be heated because the gradient to the side is not so high. At the same time, the material can be preheated before the actual intense laser beam, which can reduce spattering in the direction of the track. At the same time, it is advantageous if, according to the 3D printing process according to the invention, the area of the profile with which starting material is melted is preceded in the direction of beam movement, i.e. in the direction of the track, by a preheating area of lower intensity and/or followed by an area of lower intensity. The use of a beam with a preheating zone does not preclude that the material to be melted is additionally preheated in another way. It should be mentioned that preheating can also take place in local areas which are, however, significantly larger than the focal area of the melting beam. Mention should be made, for example, of inductive heating with a coil to be guided over the layer to be melted, heating with a separate, extended beam, etc.

A post-heating region may help to slow down the solidification process where material is melted on a larger scale, which affects grain formation and possibly also the other material properties of the body to be formed by the additive process.

It is not mandatory that the beam intensity transverse to the beam movement direction is homogeneous within that area of the beam profile that is intense enough to melt starting material. Rather, it is also possible to use a profile with, for example, intermediate intensity maxima, or even to use separate areas in which material melting occurs, while no material is melted in the intermediate area. The non-melting of material at particular points due to a too low beam intensity can be used specifically where a non-compact body is desired. In addition, it may be possible to achieve that material melted in the higher intensity range flows to areas where the material has not been melted. The resulting heat transfer can also lead to melting at these points, so that altogether, with the same beam power a particularly wide beam could be used.

If a beam that is not homogeneous in the direction transverse to the track is used, but rather a beam that has intensity peaks across the track, it is advantageous if the intensity at these intensity peaks is at least 1.3 times, preferably at least 1.5 times, and particularly preferably at least two times as high as along the area transverse to the track in which the intensity is sufficient to melt starting material. It should be mentioned that partial intensity increases may, in some areas, also lead to a better connection to tracks lying below the current track, i.e. that a better overall hatch connection is achieved.

Where the wide beam in the direction transverse to the track does not have a homogeneous power distribution in the area where material is melted, it can be advantageous if the beam intensity is higher at the outermost sections than in the center of the beam. This can be advantageous because the energy outflow is higher towards the edge, so that more energy could be required there for melting. In such a determination of the mean beam intensity, the beam intensity transverse to the beam movement direction can typically be averaged over a range which is still small compared to the total beam width, for example by averaging over at least 0.1 mm, preferably 0.2 mm, particularly preferably over 0.3 mm, while a total beam width of over 1 mm, preferably over 2 mm, particularly preferably over 3 or 5 mm is used.

In preferred embodiments, the track on which the beam is guided will be curved at least in some areas. If necessary, in such a case it is possible to select a mean beam intensity along a section of the profile area of starting material melting beam intensity, which section is radially outermost to the track, which is higher than the mean beam intensity along a section radially innermost to the track. In other words, a higher power density is used where the beam moves faster due to the beam path curvature. This is readily possible, for example, with individually controllable diodes of a diode array, but also when a corresponding diffractive optical element is used. Again, it can be assumed that the beam intensity is correspondingly increased or decreased at the respective outer or inner radius regions when a mean beam intensity is lower, for example averaged transversely to the beam movement direction over a length of 0.1 mm, preferably 0.2 mm or 0.3 mm, as before.

In a particularly preferred embodiment, the additive process, i.e., the 3D component printing process can be carried out with an optical beam, in particular preferably with a laser beam, preferably a continuous wave laser beam. It should be noted that it is alternatively possible to use particle beams, for example electron beams or ion beams of sufficient current and energy.

Where the beam is generated by means of a laser, this laser may have an output power of at least 5 KW, preferably at least 8 kW, in particular at least 10 kW. It will have to be appreciated that the achievable beam width, which is considered to be technologically particularly advantageous, will depend on the output power of the beam. Thus, a higher power may result in an advantageously wide beam being usable at an advantageously high track speed.

As mentioned above, the effective area profile can be generated by means of different beam shaping devices, in particular by means of different DOEs.

It is possible to place several beam shaping devices spatially one after the other and/or to use them temporally one after the other. It is also possible not only to exchange the beam shaping devices to achieve different orientations, but also to provide different line widths using different beam shaping devices. This can be done in particular to produce inner volumes with wider beams, while edge areas, walls, etc. are produced with relatively narrow beams that produce a higher surface quality. Where beam shaping devices are interchanged, this can be done by placing the beam shaping optical devices such as diffractive optical elements in a magazine (e.g. a revolving magazine or a linear magazine) from which one DOE or a few DOEs are taken at a time. It is also possible to select the beam shaping devices in a power-dependent manner. Alternatively or additionally, the beam shaping device (or the DOE(s)) can be selected depending on the material to be processed.

It may be advantageous when the beam shaping device comprises at least one diffractive optical element, a beam shaping comprising for example at least one liquid crystal element in the beam path, and/or at least one reflective liquid crystal cell and/or at least one acousto-optic beam shaping device is provided. Where beam-loaded particles such as electrons or ions are used, a beam shaping device will typically be constructed with magnets.

As mentioned above, in a component printing process according to the invention, the beam shaping device can be rotated for beam orientation. However, this is not mandatory. It is also possible to rotate the beam source or, for example, where a laser beam is guided to a 3D printing area via an optical fiber, to rotate the optical fiber or the output coupler. That the entire beam source is also rotatable has already been mentioned using the example of a linear laser diode array.

According to a related aspect, the invention further relates to a 3D printing machine in which starting material is irradiated track-wise with a beam to build up a body therefrom, wherein the beam preferably has an effective area profile which is not rotationally symmetric, wherein the beam orienting assembly is preferably configured to rotate the effective area profile of the beam in accordance with the track direction.

Again, it is possible to rotate the effective area profile before a track is scanned; nevertheless, it is possible to rotate and irradiate simultaneously. The beam orienting assembly used to rotate the effective area profile may include liquid crystal matrix elements for beam shaping, diffractive optical elements, and/or prisms or prism combinations.

It should be mentioned that the beam-orienting assembly as such is also considered worthy of protection. Such a beam-orienting assembly will typically have a control or a control input to direct the beam along a track that is at least curved in some portions and then to orient the effective area profile in accordance with the track curvature. It should be noted that typically the orientation of the beam and the rotation of the beam is preferred over a component rotation.

It should further be noted that, where appropriate, a 3D printing machine may be operated with more than a single independently movable beam. Where this is the case, it may be sufficient to align only one of the beams in accordance with the invention.

It should be noted that various beam sources are themselves orientable to effect the desired oriented irradiation of the starting material. Reference is made, for example, to electrons, positrons, protons, helium, but also heavier ions, etc.

Figure 2:
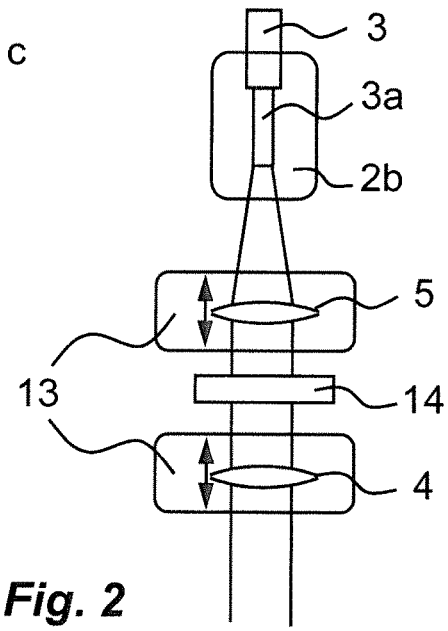
Figure 3A:
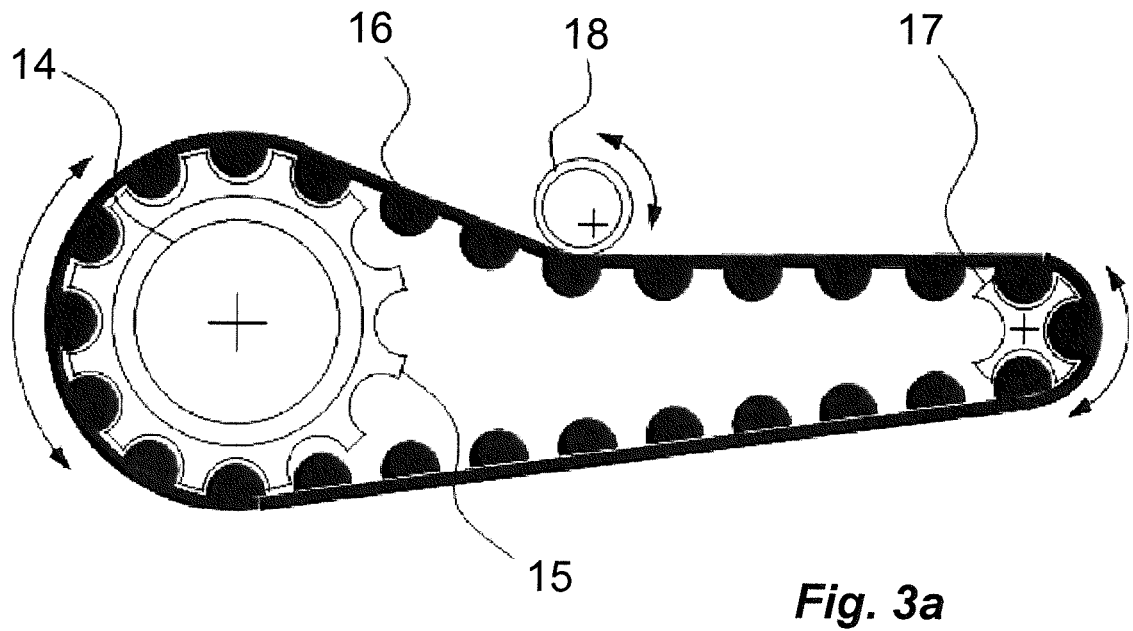
Figure 3B:
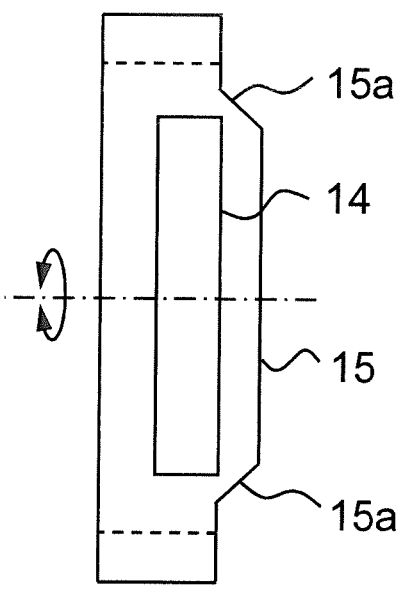
Figure 4A:
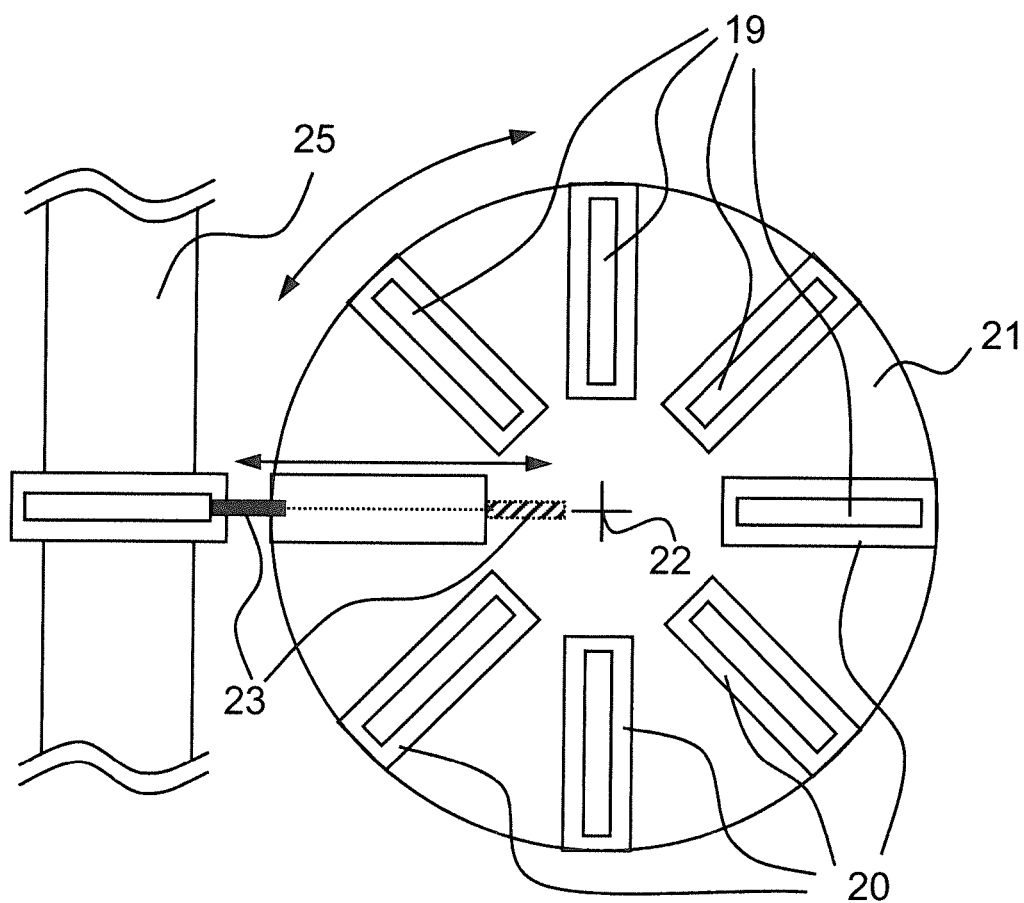
Figure 4B:
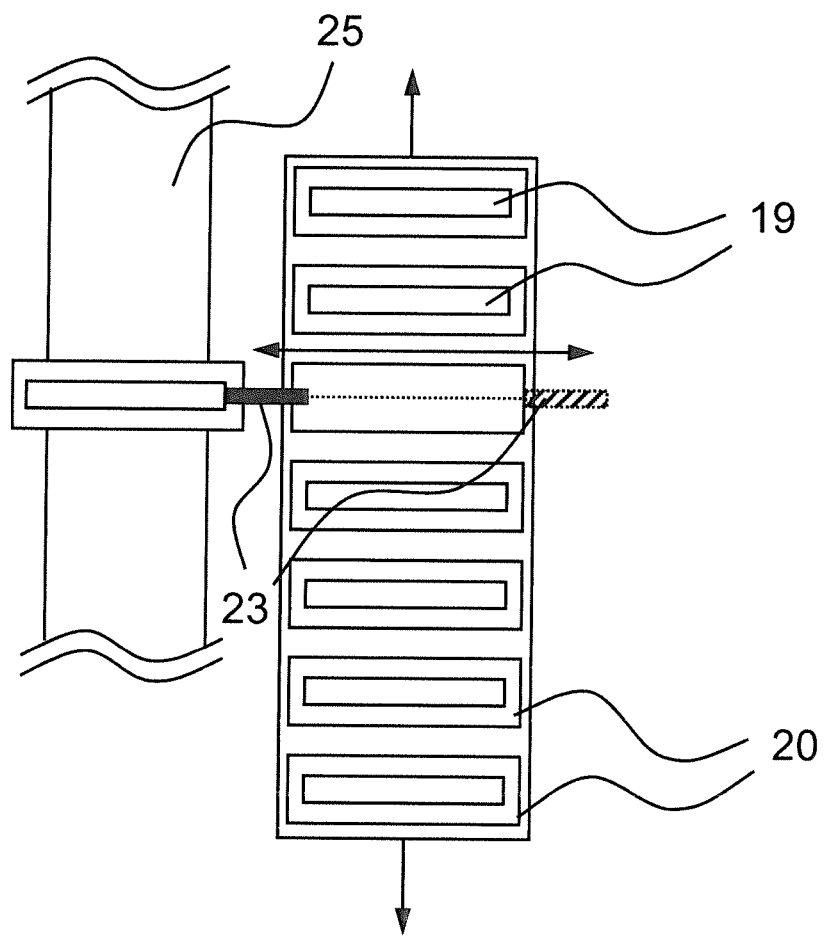

The invention is described below, by way of example only, with reference to the drawing. The drawing shows in:

FIG. 1 the beam steering unit of a 3D printing machine according to the invention;

FIG. 2 a collimator unit with fiber adapter and receptacle for a beam-orienting assembly according to the invention in accordance with detail A of FIG. 1;

FIG. 3a a detail view of a beam orienting assembly used for beam orientation;

FIG. 3b a detail thereof;

FIG. 4a an arrangement with a rotatable magazine for different diffractive optical elements which can be introduced alternately and/or in combination into an optical beam path of a 3D printing machine to achieve different shapes and/or orientations of the beam;

FIG. 4b an alternative embodiment for a beam orienting assembly with a linear magazine from which likewise different diffractive optical elements can be taken to move them into the beam path for beam shaping and/or beam orientation.

According to FIG. 1, a beam shaping and steering unit of a 3D printer, with which a body can be additively built up from starting material by irradiating it track-by-track with a beam, comprises a connection 2 for an optical fiber 3 with a fiber end 3a, into which a laser beam from a high-power laser is coupled, a zoom unit 5, a variable collimator 4, a beam steering unit 6 realized here as a galvanometer scanner, and an exit objective 7, which is designed as an F-θ objective. Connections for process monitoring 8 and a tracked camera port 9 are provided to monitor beam steering and process control. The corresponding arrangement is essentially conventional and suitable for guiding the beam 10 along paths in different machining planes 11a, 11b, 11c, whereby a corresponding volume layer of the body can be produced by the paths of a respective machining plane. The paths can be straight or curved. It should be noted that a control system can be associated with the beam steering unit in order to guide the beam in tracks as required, e.g. over a bed of preheated powder, in accordance with a digitized plan for a body to be built up additively.

The beam shaping and steering unit shown differs from conventional units of a conventional 3D printer in particular in that the beam 10 has an effective area profile which is not rotationally symmetric and can be oriented in accordance with the track direction. For this purpose, an assembly 14 may be provided for beam shaping and/or beam orientation. The assembly 14 can form the beam 10 into the area profile that is not rotationally symmetric and/or rotate the area profile that is not rotationally symmetric in the machining plane, e.g. in order to orient it in accordance with the track direction. For this purpose, for example, a free-form optical system, a liquid crystal SLM, an acousto-optic beam shaping system and/or a diffractive optical element can be used. In the exemplary embodiment shown, a diffractive optical element 14 is inserted into the beam path. This will be described in more detail with reference to FIG. 2, in which exemplary parts of the beam shaping and steering unit are shown in more detail.

The fiber coupling 2 is shown in FIG. 2 above and includes the fiber end 3a and a fiber bushing 2b for receiving the fiber end. The fiber end 3a emits light through a lens arrangement which collimates and allows zooming to subsequently obtain a parallel beam, indicated by reference numeral 13. The fiber arrangement and the lens arrangement behind the fiber arrangement are formed to obtain a homogeneous Gaussian beam with a generally circular cross-section. It is understood that real beams will vary slightly from an actual Gaussian beam, but in the expanded beam the area which focused results in the area of the effective area profile will vary by no more than 10% power density.

A converging lens is provided with which the parallel beam can be focused, and then directed in focus onto the starting material.

The diffractive optical element 14 can be inserted, for example, in the area where a parallel, homogeneous Gaussian beam is present. The diffractive optical element 14 may be configured to produce the desired area profile that is not rotationally symmetric. The diffractive optical element 14 may be rotated to orient and/or rotate this non-rotationally symmetric area profile in the machining plane. To enable the rotation of the diffractive optical element 14, the latter may be arranged rotatably in the assembly 14, for example, in such a way that the rotation can be specifically adjusted by means of the control system of the machine.

An example of such a rotatable arrangement is shown in FIG. 3a. Here, the diffractive optical element is provided inside a gear wheel with external teeth. The gear wheel 15 may be provided with a conical plain bearing surface 15a along its outer area (see FIG. 3b). A toothed belt 16 may be guided from the external teeth to a drive gear 17, so that rotation of the drive gear 17 results in rotation of the diffractive optical element together with the gear 15. The toothed belt 16 can be held taut, for example, by an eccentric tensioning roller 18.

The diffractive optical element itself can be fabricated, for example, by patterning an indium tin oxide (ITO) layer on a glass substrate by first coating the glass substrate with ITO and then patterning a phase mask into the ITO layer. In this way, a phase shift can be generated when light passes through the glass substrate, depending on the location of the passage, and intensity distributions can be selectively adjusted. It should be mentioned that other possibilities exist for producing a diffractive optical element.

The drive wheel 17 can be driven by an electric motor, which here may be configured as a stepper motor, to effect a controlled rotation of the drive wheel 17 and, via the toothed belt 16, also of the toothed wheel 15, and thus a specific orientation of the diffractive optical element incorporated in the toothed wheel 15. The stepper motor of the drive gear 17 can be controlled by the same control unit which, in the beam shaping and steering unit, also controls the galvanometer scanner(s) 5 to guide the beam along a path curved here in particular according to a digitized plan. The control and drives (not shown) are configured so that the paths can be curved according to plan in the respective machining plane 11a, 11b, 11c. The diffractive optical element 14 can be structured such that an elongated area profile is obtained from the circularly symmetric profile of the beam. The control of the drive gear 17 is preferably configured in such a way that the portion of greatest extension of the effective area profile is always perpendicular to the tangent of the track to within 10°.

In the present case, the stepper motor actuation for the diffractive optical element 14 is accordingly synchronized for this purpose with the beam steering galvanoscanner 6 and is actuated according to plan.

In the present embodiment, the data required for printing a component, according to which the beam is guided over the starting material, are preferably available in digitalized form. The diffractive optical element, which is built into the gear wheel 15, is preferably oriented in accordance with the curved beam path during irradiation. This continuously ensures that the effective area profile of the beam is oriented in accordance with the track direction.

It should be mentioned, however, that it is not mandatory that the beam is oriented in accordance with the track curvature at all times. Rather, it is also possible to use different diffractive optical elements for different orientations of the track path, each of which is fixed and not moving during its use. Alternatively and/or additionally, such different diffractive optical elements can be used to shape the beam 10 differently, i.e. to generate different effective area profiles. The generated area profiles can be of different widths, have different intensity distributions within the respective area profile (such as with preheating zones) and/or have different shapes (such as rectangular, oval, elliptical, half-moon shaped).

Different diffractive optical elements can be fed e.g. via a magazine arrangement. Such a magazine arrangement is exemplarily shown in FIG. 4a. Here, different diffractive optical elements 19 are arranged in exchangeable magazine holders 20 of an exchangeable magazine 21, which is rotatable about an axis 22, the respective diffractive optical elements being insertable into the optical beam path 25 by an actuating means 23. The diffractive optical elements 19 inserted in the various circumferentially arranged holders 20 of the arrangement 21 can produce an effective area profile, each of which is elongated to the same length, but each of which is rotated by a few degrees. In this way, when a path is scanned, an orientation of the beam which is particularly good for the orientation of this path can be selected in advance. Alternatively, the different diffractive optical elements 19 can produce different area profiles and/or area profiles with different intensity distributions. The diffractive optical elements 19 can be changed automatically, especially by the mentioned control in accordance with to a presetting or in accordance with the provided digital data.

Another possibility to change a diffractive optical element, which causes a different orientation and/or shaping in the beam, is shown in FIG. 4b. There, a linear change magazine holder is provided, which accommodates several diffractive optical elements 19, e.g. in change magazine holders 20. The respective diffractive optical elements 19 can be inserted into the optical beam path 25 by an actuating means 23, which can move e.g. transversely and/or perpendicularly to the direction of extension of the magazine. This change magazine holder can resemble a linear slide tray, from which a selected diffractive optical element can be moved into the beam path like a slide.

The process can be used with various powder mixtures known in the prior art, for example tungsten carbide, hot-working steel powder and so on. As will be appreciated, despite high machining speeds, it is possible to obtain good microstructures with the beam rotation according to the invention, and to select the processing speed to be about ten times as high as with point-shaped or circularly symmetric planar focus.

The invention claimed is:

1. A 3D component printing process, wherein a body is built up from a starting material which is irradiated track by track with a beam, the beam having a beam path and an effective area profile, the effective area profile not being rotationally symmetric;
   wherein the effective area profile of the beam is simultaneously rotated during the track by track irradiation and oriented in accordance with the track direction,
   wherein different diffractive optical elements are arranged in a magazine,
   wherein the effective area profile is generated with at least one beam shaping device,
   wherein the beam shaping device comprises at least one of said diffractive optical elements, and
   wherein said at least one diffractive optical element is extracted from the magazine, inserted into the beam path, and rotated to orient or rotate the effective area profile.

2. The 3D component printing process of claim 1, wherein the effective area profile has a width B1 transverse to the track direction and a width B2 in the track direction, wherein B1>1.5*B2.

3. The 3D component printing process according to claim 1, wherein the starting material is melted by irradiation and a profile of the starting material melting beam intensity has a profile that is transverse to the track and is at least 1.5 times as wide as in the direction of the track.

4. The 3D component printing process according to claim 1, wherein the beam is guided on a track which is curved at least in some portions, and the effective area profile is oriented in accordance with the curvature.

5. The 3D component printing process according to claim 1, wherein the beam has a movement direction in which the profile area of the starting material melting intensity is preceded by a preheating area of lower intensity or followed by an area of lower intensity.

6. The 3D component printing process according to claim 1, wherein the beam intensity varies transverse to the beam movement direction over the profile area of the starting material melting beam intensity.

7. The 3D component printing process according to claim 1, wherein the beam comprises an optical beam.

8. A 3D printed component produced by the 3D component printing process of claim 1.

9. The 3D component printing process according to claim 1, wherein the magazine is a revolving magazine or a linear magazine.

10. A beam orienting assembly for a 3D printing machine comprising:
    a starting material configured to be irradiated track-wise with a beam to build up a body therefrom, the beam having a beam path and an effective area profile which is not rotationally symmetric;
    wherein the beam orienting assembly is adapted to simultaneously rotate the effective area profile of the beam during the track by track irradiation in accordance with the track direction,
    wherein the beam orienting assembly comprises different diffractive optical elements that are arranged in a magazine, wherein the effective area profile of the beam is generated by means of at least one beam shaping device comprising
at least one of said diffractive optical elements, and
wherein said at least one diffractive optical element is configured to be extracted from the magazine, inserted into the beam path, and rotated to orient or rotate the effective area profile.

11. The beam orienting assembly of claim 10, further comprising a liquid crystal matrix configured for beam shaping, diffraction, or rotation.

12. The beam orienting assembly of claim 10, further comprising a controller configured to direct the beam along a track curved in at least in some portions, and orienting the effective area profile in accordance with the track curvature.

13. The beam orienting assembly of claim 12, wherein the 3D printing machine further comprises a beam source which is configured to generate a beam intended for irradiation into the beam orienting assembly, and wherein the beam orienting assembly is configured to output a beam irradiated therein with an oriented effective area profile.

* * * * *